United States Patent
Compagnat et al.

(10) Patent No.: US 11,635,346 B1
(45) Date of Patent: Apr. 25, 2023

(54) BEARING ELEMENT INSPECTION SYSTEM AND METHOD

(71) Applicant: General Electric Company, Schenectady, NY (US)

(72) Inventors: Jessen Compagnat, Bromont (CA); Marc Andre Ethier, Marieville (CA); Maxime Beaudoin-Pouliot, St-Césaire (CA); John Karigiannis, Laval (CA); Stephane Harel, Granby (CA)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/590,029

(22) Filed: Feb. 1, 2022

(51) Int. Cl.
| | |
|---|---|
| G01M 13/04 | (2019.01) |
| G01N 21/95 | (2006.01) |
| H04N 5/232 | (2006.01) |
| G06T 7/00 | (2017.01) |
| H04N 5/247 | (2006.01) |
| G01N 21/88 | (2006.01) |

(52) U.S. Cl.
CPC ............ G01M 13/04 (2013.01); G01N 21/95 (2013.01); G06T 7/0004 (2013.01); H04N 5/23299 (2018.08); H04N 5/247 (2013.01); *G01N 21/8851* (2013.01); *G06T 2207/30164* (2013.01)

(58) Field of Classification Search
CPC .................. H04N 5/23299; G06T 2207/30164
See application file for complete search history.

(56) References Cited

U.S. PATENT DOCUMENTS

| | | | | |
|---|---|---|---|---|
| 5,012,116 A * | 4/1991 | Russell | ................ | G01N 21/951 250/559.46 |
| 5,457,326 A * | 10/1995 | Tsujita | ............... | G01B 11/2408 356/426 |
| 6,293,151 B1 * | 9/2001 | Kawamata | .......... | G01M 13/045 73/593 |
| 10,060,857 B1 | 8/2018 | Bouchard | | |
| 10,458,966 B2 | 10/2019 | Leslie | | |
| 10,726,543 B2 | 7/2020 | Bian | | |
| 10,746,667 B2 | 8/2020 | Bian | | |
| 10,755,401 B2 | 8/2020 | Bian | | |
| 2020/0166467 A1 | 5/2020 | Bian | | |
| 2020/0167905 A1 | 5/2020 | Bian | | |
| 2020/0175669 A1 | 6/2020 | Bian | | |

FOREIGN PATENT DOCUMENTS

| | | |
|---|---|---|
| DE | 102016204495 | 9/2017 |
| EP | 3056895 | 8/2016 |
| GB | 1171353 | 11/1969 |
| GB | 2545429 | 6/2017 |
| WO | 8902574 | 3/1989 |
| WO | 2020051728 | 3/2020 |

* cited by examiner

*Primary Examiner* — Kathleen V Nguyen
(74) *Attorney, Agent, or Firm* — Fitch, Even, Tabin & Flannery, LLP

(57) ABSTRACT

A first nest structure and a second nest structure are brought into alignment. When the alignment of the first nest structure and second nest structure is obtained, the operation of at least one vacuum pump is controlled such that a bearing element is released from the first nest structure and secured in the second nest structure. Movement of the bearing element from the first nest structure to the second nest structure occurs without slippage resulting in preservation of a common frame of reference used when the bearing element is in the first nest structure and the second nest structure.

20 Claims, 10 Drawing Sheets

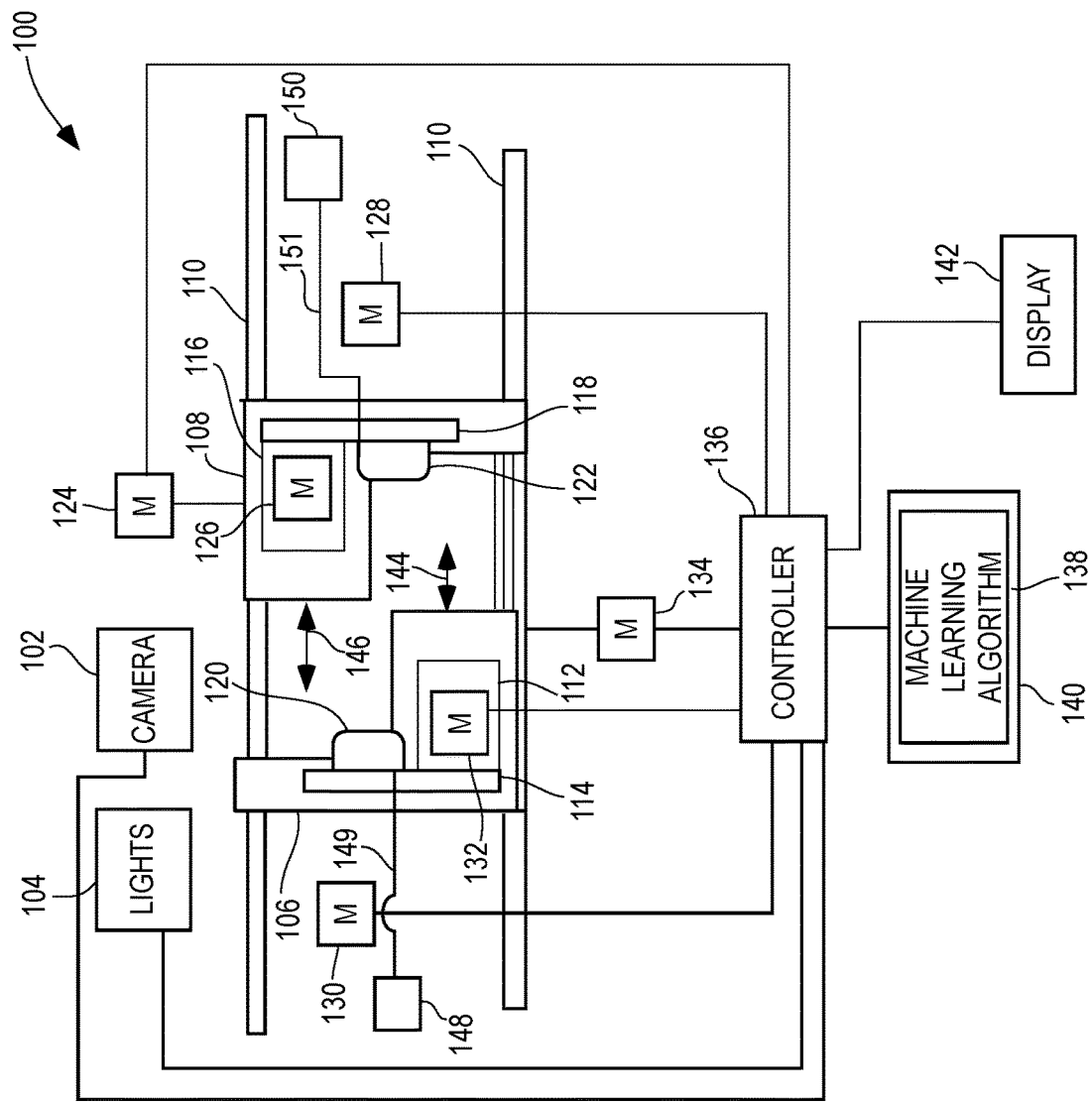

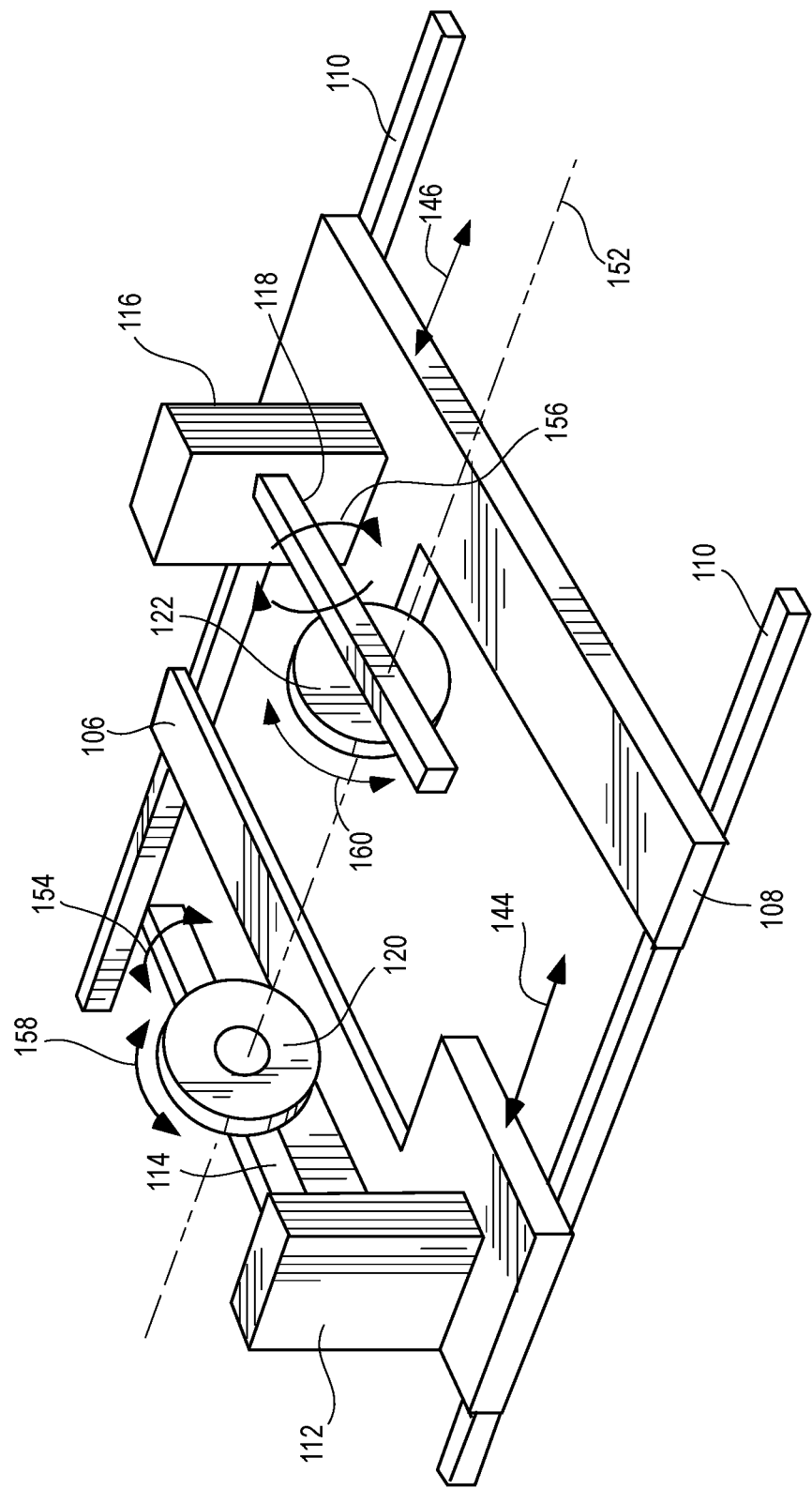

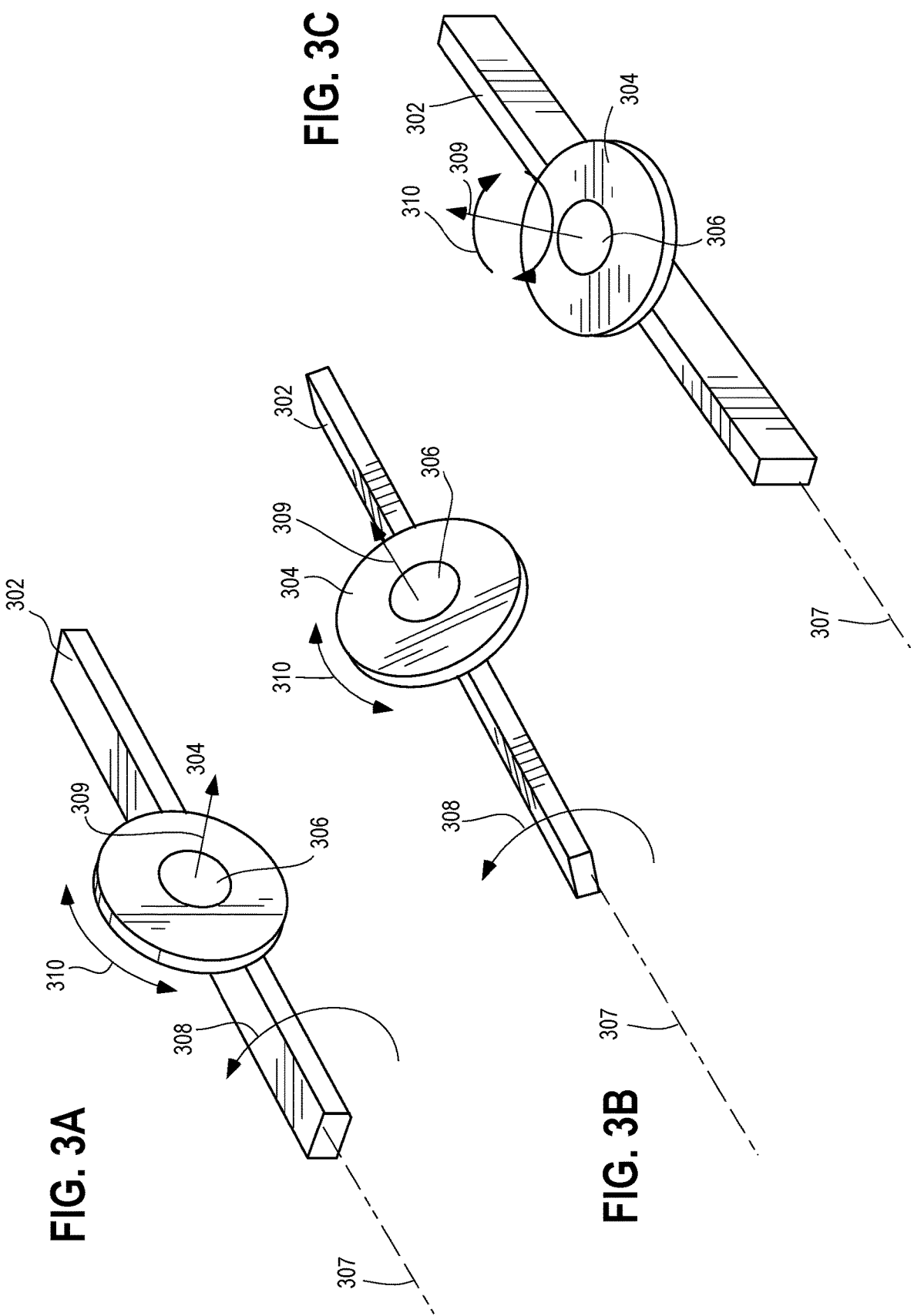

BEARING ELEMENT INSPECTION SYSTEM AND METHOD

TECHNICAL FIELD

The field of the invention generally relates to inspection systems and methods for industrial components and, in particular, inspection systems and methods for bearing components such as ceramic balls.

BACKGROUND

Various machine assemblies (such as turbine engines used in aircraft) are utilized in vehicular and industrial applications. These assemblies include different types of components, which are regularly inspected to ensure proper performance of the assemblies. During an inspection, the machine assembly may be transported to a service shop, wherein the machine assembly is disassembled into its component parts. Examples of components that are inspected include bearing assembly components, for instance, metal or ceramic balls or rollers.

BRIEF DESCRIPTION OF THE DRAWINGS

The inventive subject matter described herein will be better understood from reading the following description of non-limiting embodiments, with reference to the attached drawings. A full and enabling disclosure of the aspects of the present description, including the best mode thereof, directed to one of ordinary skill in the art, is set forth in the specification, which refers to the appended figures, in which:

FIG. 1 is a block diagram of an inspection system according to an embodiment;

FIG. 2 is a simplified perspective diagram of the system of FIG. 1 inspection system according to an embodiment;

FIGS. 3A, 3B, and 3C illustrate an arm and nest structure of the inspection system in different positions according to an embodiment;

DETAILED DESCRIPTION

Figure 4A:
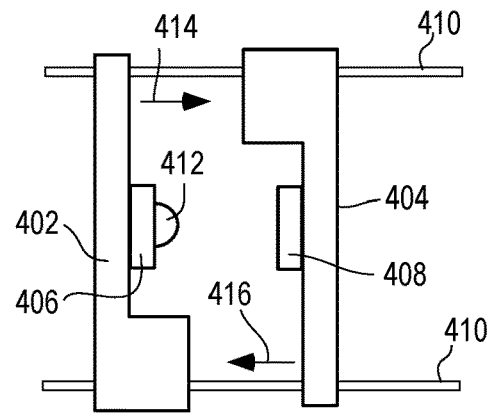
FIGS. 4A, 4B, and 4C illustrate stage structures at different positions according to an embodiment.

Generally speaking, approaches are provided that allow a bearing element (e.g., a ceramic ball) to be completely inspected by obtaining images that can be verified to entirely cover all visible surfaces of the bearing element. A fixed system of reference for imaging the bearing element is maintained no matter how the bearing element is moved, turned, rotated, or otherwise adjusted to obtain the images. These approaches provide extremely accurate automatic fault or defect determination and reduce or eliminate the need to perform costly manual inspections.

In many of these embodiments, a system includes one or more cameras, one or more motors, a first stage structure, a second stage structure, a first manipulator structure, a second manipulator structure, and a controller.

The first stage structure is coupled to and movable along one or more tracks (or other linear guides or paths) by the one or more motors. The second stage structure is also coupled to and movable along the one or more tracks by the one or more motors.

The first manipulator structure is disposed on the first stage structure and includes a first nest structure. The first nest structure is configured to secure a bearing element. The second manipulator structure is disposed on the second stage structure and includes a second nest structure. The second nest structure is also configured to secure the bearing element.

The controller is coupled to the one or more cameras and the one or more motors. The controller is configured to control operation of at least one vacuum pump so as to initially secure the ball in the first nest structure. The controller is further configured to actuate the one or more motors to responsively move the first stage structure and the second stage structure into an alignment such that the first nest structure is aligned with and adjacent to the second nest structure and the ball is at least partially contained in the first nest structure and second nest structure.

When the alignment of the first nest structure and second nest structure is obtained, the controller is configured to control operation of the at least one vacuum pump such that the bearing element is released from the first nest structure and secured in the second nest structure. Movement or securement of the bearing element from the first nest structure to the second nest structure occurs without slippage resulting in preservation of a common frame of reference used when the bearing element is in the first nest structure and the second nest structure.

The controller is further configured to actuate the one or more cameras to obtain images of the bearing element and analyze the images to determine defects of the bearing element.

In other aspects, the first manipulator structure is disposed on the first stage structure and the first manipulator structure includes a first manipulator arm. Movement of the first arm controlled by the one or more motors. The second manipulator structure includes a second manipulator arm, and movement of the second manipulator arm controlled by the one or more motors. The controller is further configured to actuate the one or more motors so as to move or rotate one or more of the first manipulator arm and the second manipulator arm. Movement of the first manipulator arm or the second manipulator arm is effective to also move the first nest structure or the second nest structure and adjust a position of the bearing element with respect to the one or more cameras.

In examples, the movement of the first manipulator arm and the second manipulator arm is a rotation. In other examples, the first nest structure and the second nest structure are individually movable by the one or more motors.

In still other aspects, the images are analyzed using a machine learning algorithm. For example, a neural network that has been trained can be used. Other examples are possible.

In still other examples, the bearing element comprises a ball or a roller and the defects comprise cracks. Other examples of bearing elements and defects are possible.

In yet other examples, the first nest structure comprises a bowl-shaped structure with an opening (e.g., a hole) at a bottom of the bowl-shaped structure. In aspects, the opening communicates with a vacuum pump via a tube. Application of a vacuum secures the bearing element in the first nest structure.

In others of these embodiments, an approach for inspecting a bearing element comprises providing a first stage structure that is coupled to and movable along one or more tracks by one or more motors and a second stage structure that is coupled to and movable along the one or more tracks by the one or more motors. A first manipulator structure is disposed on the first stage structure and includes a first nest structure, and the first nest structure is configured to secure a bearing element. A second manipulator structure is disposed on the second stage structure and includes a second nest structure, and the second nest structure is also configured to secure the bearing element.

Operation of at least one vacuum pump is controlled so as to initially secure the bearing element in the first nest structure. The one or more motors are then actuated to responsively move the first stage structure and the second stage structure into an alignment such that the first nest structure is aligned with and adjacent to the second nest structure and the bearing element is at least partially contained in the first nest structure and second nest structure.

When the alignment of the first nest structure and second nest structure is obtained, operation of the at least one vacuum pump is controlled such that the bearing element is released from the first nest structure and secured in the second nest structure. Movement or the switching of securement of the bearing element from the first nest structure to the second nest structure occurs without slippage resulting in preservation of a common frame of reference used when the bearing element is in the first nest structure and the second nest structure.

During this process, the one or more cameras are actuated to obtain images of the bearing element. The images are analyzed to determine defects of the bearing element.

During inspection, the various component parts or work pieces of the machine assembly are individually examined for defects or anomalies such as spallation, cracks, nicks, scratches, kinks, pits, or the like. The presence of defects or anomalies indicates that the part may be damaged and could risk the integrity of the machine assembly if reassembled into the machine assembly. Typically, such inspections are manually performed by a human operator that inspects the parts by hand. If the operator detects a defect, the operator may consider various factors such as the type of defect, the size of the defects, and the like, to determine whether to scrap or discard the part, repair the part, or approve the part for reuse within the machine assembly without repair.

Many known manual processes for detailed part inspection are subjective, inconsistent, inefficient, and/or inaccurate. In the case of previous processes used to inspect bearing elements, it has been difficult to gain full coverage of the bearing element as the bearing element had to be manually moved or rotated into different positions. This movement or rotation often caused the bearing element to unintentionally slip or slide, making it impossible to maintain a constant frame of reference and determine whether full inspection coverage of the element was obtained.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to FIG. 1, one example of a system 100 for inspecting bearing elements is described. It will be appreciated that although the approaches described herein relate to bearing elements, these approaches are applicable to inspecting other components and not only components from bearing systems or assemblies.

The system 100 includes a camera 102, lights 104, a first stage structure 106, a second stage structure 108, tracks (or linear guides) 110, a first manipulator structure 112 (with a first manipulator arm 114), a second manipulator structure 116 (with a second manipulator arm 118), a first nest structure 120 (coupled to the first manipulator arm 114), a second nest structure 122 (coupled to the second manipulator arm 118), motors 124, 126, 128, 130, 132, and 134, a control circuit or controller 136, machine learning algorithms 138 stored in a memory 140, a display 142, a first vacuum pump 148, and a second vacuum pump 150.

The camera 102 is any type of camera or sensor that is configured to obtain images. The images can be in visible light but can also be of any other wavelength including x-rays, infrared, or other wavelengths. The camera 102 may include multiple cameras that are positioned at different locations, positions, heights and angles with respect to the bearing elements being inspected. The camera 102 may be disposed upon or held by an appropriate stand or other structure. The camera can represent any suitable imaging device including any optical sensor capable of capturing still or moving images. Suitable types of cameras may be a CMOS camera, a CCD camera, an analog, a digital camera, a video camera or any other type of device capable of capturing an image.

The lights 104 are lighting devices that illuminate at least a portion of the component being inspected including in the example, the bearing element. Multiple lights or a single light may be used. Different colors, wavelengths, or other characteristics can be provided by the lights 104.

The first stage structure 106 and the second stage structure 108 are constructed of any appropriate material (such as a metal or hard plastic) that have sufficient strength and ability to carry or support bearing elements. In the example of FIG. 1, the first stage structure 106 and the second stage structure 108 are generally L-shaped plates and move along the tracks 110 back-and-forth along the directions indicated by the arrows labeled 144 and 146. The first stage structure 106 is coupled to and movable along the tracks 110 by the motor 134. The second stage structure 108 is coupled to and movable along the tracks 110 by the motor 124. The first stage structure 106 and the second stage structure 108 are aligned opposite to each other. In other examples, it is possible that the first stage structure 106 and second stage structure are actuated by the same motor.

The first manipulator structure 112 is disposed on the first stage structure 106. The first manipulator structure 112 includes the first manipulator arm 114. Attached or coupled to the first manipulator arm 114 is the first nest structure 120. The first nest structure 120 is configured to secure a bearing element (not shown in FIG. 1). The bearing element may be a metal or ceramic ball or a roller to mention a few examples. The first nest structure 120 includes a housing with an opening in which is placed the bearing element.

The second manipulator structure 116 is disposed on the second stage structure 108. The second manipulator structure 116 includes a second manipulator arm 118. Attached or coupled to the second manipulator arm 118 is the second nest structure 122. The second nest structure 122 is also configured to secure the bearing element and is generally opposite the first nest structure 120. The second nest structure 122 includes a housing with an opening in which is placed the bearing element.

The first manipulator structure 112 and the second manipulator structure 116 are any type of support structures that support, hold, guide, control, include, and/or contain the first manipulator arm 114 or the second manipulator arm 118. In these regards, the first manipulator structure 112 and the second manipulator structure 116 may be constructed of appropriate metal or plastic elements that secure, hold, or support the first manipulator arm 114 or the second manipulator arm 118, and any mechanical, electrical or other connections from the motors 126, 128, 130, and 132 that control movement of the arms. These connections may include transmission elements such as belts, pulleys, levers, wires, or other such components that transmit mechanical force from the motors 126, 128, 130, and 132 to the first manipulator arm 114 or to the second manipulator arm 118, or the first nest structure 120 and second nest structure 122. It will be appreciated that the exact dimensions, shape, form factor, and number of elements comprising the first manipulator structure 112 and the second manipulator structure 116 can vary depending upon the exact needs of the system and the user.

The first manipulator arm 114 and the second manipulator arm 118 are elongated structures or members that are configured to hold, contain, include, or connect to the first nest structure 120 and the second nest structure 122. The first manipulator arm 114 and the second manipulator arm 118 may be constructed of appropriate metallic, hard plastic, or other elements that have the strength to make and maintain these connections.

An axis extends longitudinally along the length of the first manipulator arm 114 and the first manipulator arm 114 is rotatable by the motor 132 about this axis, in one example, 360 degrees. Another axis extends longitudinally along the length of the second manipulator arm 118 and the second manipulator arm 118 is rotatable by the motor 126 about this axis, in one example, 360 degrees. As the first manipulator arm 114 rotates, the first nest structure 120 also rotates with the first manipulator arm 114. As the second manipulator arm 118 rotates, the second nest structure 122 also rotates with the second manipulator arm 118. Consequently, and as the arms are rotated, when a bearing element is disposed in either the first nest structure 120 or the second nest structure 122, the bearing element can be viewed at different angles and positions by the camera 102 and different images from these different angles and positions can be obtained.

The first manipulator arm 114 and the second manipulator arm 118 may be of any suitable configuration and dimensions. In one example, the first manipulator arm 114 and the second manipulator arm 118 are single elongated elements or members. In other examples, the first manipulator arm 114 and the second manipulator arm 118 are multiple elements or multiple members. In one example, the first manipulator arm 114 and the second manipulator arm 118 are identical in dimensions and configuration. However, in other examples the first manipulator arm 114 and second manipulator arm 118 may have different dimensions and may be of a different dimensions and configuration.

The first nest structure 120 and second nest structure 122 are configured to secure and hold the bearing elements. In one example, the first nest structure 120 and second nest structure 122 comprise a housing (constructed of any appropriate material such as a metal or plastic) with an exposed opening in each. The materials selected to construct the first nest structure and the second nest structure are selected so as to be able to support and hold a bearing element. The opening may form, in one example where the bearing element is a ceramic ball, an exposed bowl-shaped structure within the first nest structure 120 and second nest structure 122. The bowl-shaped structure formed in the first nest structure 120 and the second nest structure 122 conforms to (or generally conforms to) the shape of the ceramic ball such that the ceramic bowl fits snuggly in and can be held by the bowl-shaped structure. It will be appreciated that if a component other than a ball-shaped object is held, then the dimensions, configuration, and/or shape of the bowl-shaped structure is changed to conform to the dimensions, configuration, and/or shape of the component. In one example, when the ceramic ball is placed in the bowl-shaped structure, at least a portion of the ceramic ball is held within the bowl-shaped structure. By way of further non-limiting example, this may include that half of the ceramic ball is held and the other half extends out of the bowl-shaped structure.

Vacuum tubing 149 and vacuum tubing 151 couple to or communicates with (respectively) the vacuum pumps 148 or 150 and the vacuum pump 148 and vacuum pump 150 provide a suction or other force that (when applied) further secures the ceramic ball in the bowl-shaped structure. The vacuum tubing 149 and vacuum tubing 151 couple (respectively) to the first nest structure 120 and the second next structure 122, for example, via an opening at the bottom of the bowl in these nest structures. Once the ceramic ball is fully placed in the bowl-shaped structure and the vacuum pumps 148 or 150 are activated, the ceramic ball is secured such that the ceramic ball does not slip, slide, or otherwise move within the first nest structure 120 or the second nest structure 122 upon movement of any of the stage structures, manipulator arms, or nest structures.

The housing of the first nest structure 120 or the second nest structure 122 may also be configured so as to be able to rotate the bowl-shaped structure (and hence any bearing element secured in the bowl-shaped structure). For example, a turn table-like device may be incorporated into the housing so as to rotate the first nest structure 120 or second nest structure 122 about an axis that extends longitudinally outward from the center of the bowl-shaped structure. During rotation, the bearing element does not slip or slide within the bowl-shaped structure.

The motors 124, 126, 128, 130, 132, and 134 are any type of drive element or motor device (e.g., an electric motor) that act to move, turn, rotate, push, pull, or otherwise control an element in the system. It will be appreciated that these motors 124, 126, 128, 130, 132, and 134 will couple to other transmission elements and the coupling (shown only generally in FIGS. 1 and 2) will be accomplished using transmission devices or components such as pulleys, belts, levers, wheels, gears, shafts, or other similar elements. The exact combination of transmission elements used depends upon the requirements of the system and the user.

In a non-limiting example, the motor 124 couples to the second stage structure 108. The motor 134 couples to the first stage structure 106. The motor 126 couples to the second manipulator arm 118. The motor 132 couples to the first manipulator arm 114. The motor 128 couples to the second nest structure 122. The motor 130 couples to the first nest structure 120.

All of the motors 124, 126, 128, 130, 132, and 134 are coupled to the controller 136. The controller 136 selectively actuates and deactivates the motors as needed to move the various stage structures, manipulator arms, and nest structures to allow the bearing element in the first nest structure 120 or the second nest structure 122 to be examined and imaged from multiple angles and positions such that all surfaces of the bearing element are completely imaged, inspected, and/or covered.

The memory 140 is any type of electronic memory storage device. The memory may include one or more machine learning algorithms 138. The machine learning algorithms 138 may be any type of machine learning algorithms including neural networks. The machine learning algorithms 138 may be used to analyze data (e.g., images) obtained by the camera 102. For example, the machine learning algorithms 138 may determine if defects are present on the bearing element, the type of defects (e.g., cracks), dimensions of the defects, and nature of the defects (e.g., severe or minor). The machine learning algorithms 138 may also determine actions to take such as determining and issuing alerts to users of the system (or others such as scrapping the part or keeping the part).

In other aspects, the machine learning algorithms 138 may be trained to determine defects. In one example and when the machine learning algorithms 138 comprise a neural network, the neural network can be trained using images that are known (and labelled) as being from defective or non-defective parts. After the neural network is trained and when the system 100 is operating in an inspection phase, images obtained by the camera 102 are applied to the neural network to yield a determination as to whether the image indicates a defect or does not indicate a defect. The neural network can also be trained to yield a result of the type of defect, and/or possible actions to take regarding the defect (e.g., replacing the part).

The display 142 is any type of electronic display (e.g., screen or touch screen) that renders information, e.g., visual images, to a user. The display can be incorporated into user electronic equipment where the user electronic equipment includes smartphones, cellular phones, personal computers, laptops, or tablets to mention a few examples. The images may include the images obtained by the camera 102.

The vacuum pumps 148 and 150 are any types of devices that provide a suction or force to secure bearing elements in the first nest structure 120 and the second nest structure 122. The vacuum pumps 148 and 150 may couple to tubes that, in turn, couple to the first nest structure 120 and the second nest structure 122. The vacuum pumps 148 and 150 may be activated by applying a voltage to the vacuum pumps 148 and 150, and deactivated by removing the voltage. During an exchange operation (where the bearing element is exchanged between the first nest structure 120 and the second nest structure 122), one pump for one nest structure is activated initially, then as the bearing element has been secured in the other nest structure this pump is deactivated while the other pump is activated. In this way, the bearing element and control of the bearing element is passed from one nest structure to the other nest structure without slippage within the nest structures allowing a common coordinate system describing the bearing element to be used.

The controller 136 is coupled to the memory 140 (with the machine learning algorithms 138), the motors 124, 126, 128, 130, 132, and 134, the lights 104, the camera 102, the display 142, the first vacuum pump 148 and the second vacuum pump 150. It will be appreciated that as used herein the terms "controller" or "control circuit" refer broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here.

The controller 136 may be programmed with computer instructions (e.g., in the form of a computer program) that operate the camera 102, lights 104, and motors. For example, the computer instructions may actuate the lights 104 and the camera 102. A sensing device or sensor may determine when a bearing element is placed in the first nest structure 120 (e.g., the bearing element may be placed manually or placed by a robot or automated device). The computer instructions may actuate the first vacuum pump 148 to secure the bearing element in the first nest structure 120.

The computer instructions then may operate the motor 130 to rotate the first nest structure 120 (or the motor 132 to rotate the second nest structure 122) so that the bearing element being held by the first nest structure 120 (or the second nest structure 122) rotates. The computer instructions may then activate the camera to obtain images of the bearing element in multiple positions. When this is completed, the computer instructions may operate the motor 134 and/or motor 124 to move the first nest structure 120 and/or the second nest structure into alignment so that the bearing element and its control can be passed from the first nest structure 120 to the second nest structure 122 (or vice versa).

In other aspects, the controller 136 executing the computer instructions selectively operates the motor 134 and/or the motor 124 to move the first stage structure 106 and the second stage structure 108. In other examples, the controller 136 by executing the computer instructions selectively operates the motor 126 to manipulate the second manipulator arm 118 and selectively operates the motor 132 to manipulate the first manipulator arm 114. This movement may be rotating the second manipulator arm 118 or the first manipulator arm 114, which rotates any bearing element held in the first nest structure 120 or the second nest structure 122. The exact movements (e.g., amount of rotation) may be preprogrammed and may depend upon the needs of the system or the user.

In still other aspects, the controller 136 may deactivate the first vacuum pump 148 and activate the second vacuum pump 150 to accomplish the passing of the bearing element from the first nest structure 120 to the second nest structure 122 after the bearing element has been positioned in both the first nest structure 120 and the second nest structure 122. Activation may be accomplished by applying a voltage to a vacuum pump and the deactivation may be accomplished by removing the voltage. The operations may be reversed to pass the bearing element from the second nest structure 122 to the first nest structure 120.

Once the bearing element has been passed from the first nest structure 120 to the second nest structure 122 (or vice versa) the computer instructions may operate the motor 126 to move the second manipulator arm 118 or the motor 128 to move the second nest structure and actuate the camera 102 to obtain images of the bearing element while in different positions. After this is complete, the controller 136 executing the computer instructions may release the bearing element by deactivating the second vacuum pump 150. The bearing element may be manually removed from final nest structure (the first nest structure 120 or the second nest structure 122) or automatically removed by a robot or automated device or vehicle.

In these approaches, the bearing element can be described by coordinates of a coordinate system thereby providing a frame of reference. For example, three dimensional coordinates (x, y, and z coordinates) or spherical coordinates (r, theta, phi, where r=radius of the sphere–theta=polar angle, and phi azimuthal angle) can be used to describe a point on the surface of the bearing element (e.g., when the bearing element is a ceramic ball) or a point internal to the bearing element. In the present approaches, this coordinate system is the same and is used in common in all positions of the bearing element no matter where the bearing element is located (i.e., which nest structure). More specifically, the same coordinate system is used to describe the bearing element when the bearing element is in the first nest structure or the second nest structure, no matter how the arms are rotated or where the stage structures have been moved.

As mentioned, the bearing element is secured to the nest structures during all movements. The bearing element does not slip, slide, or move within the nest structure when movements occur or at any other time. All of this allows the common coordinate system or frame of reference to be used to describe points or areas of the bearing element. This, in turn, allows defects of the bearing element to be analyzed, categorized and identified with precision, certainty, and without duplication. Consequently, these approaches allow for precise analysis of the results with certainty of where defects or other features are present on (or in) the bearing element and/or whether all surfaces of the entire bearing element have been examined (e.g., the entire surface of the bearing element when the bearing element is a ceramic ball).

For example, using these approaches there is no concern that one is viewing or analyzing a duplicate defect in the bearing element as between different images because the fixed coordinate system has already tagged an area and this tag and its coordinates are accurate no matter where the bearing component is located and no matter what movement has occurred. As mentioned, maintaining a common coordinate system ensures that the entire bearing element can be examined since it is known with complete certainty which areas have been examined and which areas have yet to be examined. All of these advantages allow accurate image processing, the identification and tagging of defects and potential defects, the analysis of these defects, and the presentation of information (e.g., photos) of the defects or the bearing element to be rendered to users.

Referring now especially to FIG. 2, a simplified perspective view (of some of the elements) of the system of FIG. 1 is described. As shown, the nest structures 120 and 122 align along line 152, so that when the nest structures 120 and 122 are brought into close proximity or contact (by moving the first stage structure and the second stage structure), the bearing element can be passed from one of the nest structures 120 or 122 to the other of the nest structures 120 and 122. In these regards the first nest structure 120 and second nest structure may contact each other and each may have the same dimensions and form factor.

The bearing element will rotate with the nest structure 120 or 122 as the nest structure 120 or 122 is rotated in the direction indicated by the arrow labeled 158 or 160 but will not slip or move within the nest structures. The amount of rotation can be any amount, for example, a full 360 degrees. The first manipulator arm 114 and the second manipulator arm 118 also rotates in the direction indicated by the arrows labeled 154 and 156. In one example, the first manipulator arm 114 and the second manipulator arm 118 may rotate 360 degrees, but in other examples the amount of rotation is more limited.

In one example of the operation of the system of FIG. 1 and FIG. 2, the controller 136 is configured to control operation of the first nest structure 120 so as to initially secure the bearing element in the first nest structure 120. This may be accomplished by activating the first vacuum pump 148. The controller 136 is further configured to actuate the motors 134 and/or 124 to responsively move the first stage structure and the second stage structure 108 into an alignment such that the first nest structure 120 is aligned with and adjacent to the second nest structure 122 and the bearing element (e.g., a ceramic ball) is at least partially contained in the first nest structure 120 and the second nest structure 122. In this exchange operation, the first nest structure 120 and second nest structure 122 may contact each other.

When the alignment of the first nest structure 120 and second nest structure 122 is obtained, the controller 136 is configured to control operation of the first nest structure 120 and the second nest structure 122 such that the bearing element is released from the first nest structure 120 and secured in the second nest structure 122. Movement of and the passing of control of the bearing element from the first nest structure 120 to the second nest structure 122 occurs without slippage within either nest structure resulting in preservation of a common frame of reference used when the bearing element is in the first nest structure 120 and the second nest structure 122. For example, the first vacuum pump 148 is first actuated to secure the bearing element in the first nest structure 120. After alignment occurs and the bearing element is positioned at least partially in each nest structure, the first vacuum pump 148 is de-actuated and the second vacuum pump 150 is actuated.

The controller 136 is further configured to actuate the motors 132 and 126 so as to move or rotate one or more of the first manipulator arm 114 and the second manipulator arm 118. Movement of the first manipulator arm 114 and/or the second manipulator arm 118 is effective to move the first nest structure 120 and/or the second nest structure 122 and adjust a position of the bearing element with respect to the camera 102. Movement of the first manipulator arm 114 and the second manipulator arm 118 occurs when the bearing element is in the corresponding nest structure and is done so as to image the bearing element in a variety of positions.

In examples, the motors 130 and 128 are actuated by the controller 136 to rotate the first nest structure 120 and/or the second nest structure 122. This rotation also rotates the bearing element. This, in turn, allows the camera 102 to be actuated by the controller 136 to obtain images from multiple vantage points and over different areas of the bearing element.

The controller 136 is further configured to actuate the camera 102 obtain images of the bearing element and analyze the images to determine defects of the bearing element. The images are obtained in various positions of the system elements so that complete visual coverage of the bearing element is obtained.

Referring now to FIGS. 3A, 3B, and 3C, one example showing movement of the manipulator arms is described. These figures show a manipulator arm 302 as it is rotated about an axis 307 in a direction indicated by the arrow labeled 308. A nest structure 304 is shown that holds a bearing element 306. The nest structure 304 rotates about an axis 309 in the direction indicated by the arrow labeled 310. The manipulator arm 302 and nest structure 304 are moved or turned by motors (not shown in these figures) and can be constructed and arranged as has been described with respect to the manipulator arms and nest structures of FIG. 1 and FIG. 2.

It can be seen that in FIG. 3A, the manipulator arm 302 is turned so that the nest structure faces a horizontal direction. In FIG. 3B, the manipulator arm 302 has rotated to that the nest structure 304 has tilted upward. In FIG. 3C, the manipulator arm 302 has been further rotated so that the nest structure 304 is facing the vertical direction. During, in between, or after any of these movements, the nest structure 304 itself may be rotated about the axis 309. Using these rotations, complete inspection coverage of the bearing element 306 by a camera taking images of the bearing element 306 can be achieved.

Figure 4B:
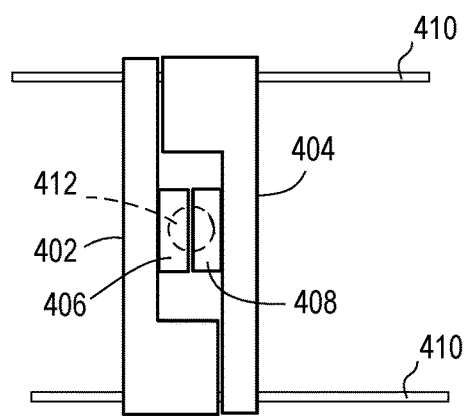
Figure 4C:
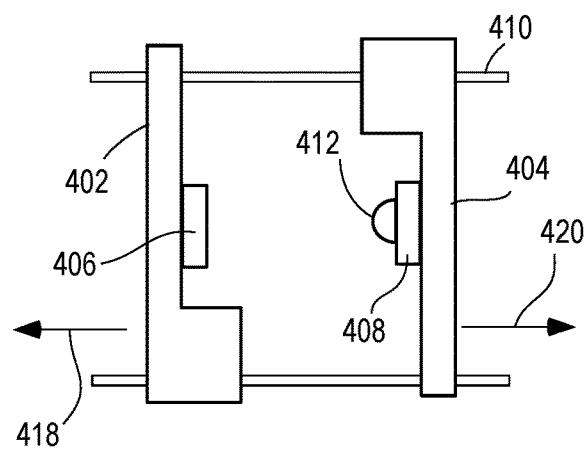

Referring now to FIGS. 4A, 4B, and 4C, movement of stage structures at different positions is described. These figures include a first stage structure 402 and a second stage structure 404 that move along rails (or linear guides) 410. The first stage structure 402 and the second stage structure 404 include manipulator structures (including manipulator arms) as described elsewhere herein, but for simplicity these are not shown in FIGS. 4A, 4B, and 4C. The first stage structure 402 includes a first nest structure 406 and the second stage structure 404 includes a second nest structure 408. The first nest structure 406 and second nest structure 408 hold and secure a bearing element 412. The bearing element 412 is passed or exchanged between the first nest structure 406 and second nest structure 408.

As shown in FIG. 4A, the bearing element 412 is secured in the first nest structure 406. The first stage structure 402 is moved along the rails 410 in the direction indicated by the arrow labeled 414 towards the second stage structure 404. The second stage structure 404 is moved along the rails 410 towards the first stage structure 402 in the direction indicated by the arrow labeled 416. As the first stage structure 402 moves, the first nest structure 406 holding the bearing element 412 moves and this moves the bearing element.

As shown in FIG. 4B, the first nest structure 406 and the second nest structure 408 have been brought together. The bearing element 412 resides partially in the first nest structure 406 and the second nest structure 408. Initially, the first nest structure 406 secures the bearing element 412. Then, the first nest structure 406 releases the bearing element 412 and the second nest structure 408 secures the bearing element 412. After control and securement of the bearing element 412 passes from the first nest structure 406 to the second nest structure 408, the first stage structure 402 and the second stage structure 404 are moved apart.

As shown in FIG. 4C, the bearing element 412 has been secured in the second nest structure 408. The first stage structure 402 is moved along the rails 410 in the direction of the arrow labeled 418 away from the second stage structure 404. The second stage structure 404 is moved along the rails 410 in the direction of the arrow labeled 420 away from the first stage structure 402.

During all of these movements, the bearing element 412 does not slip or slide within the first nest structure 406 or the second nest structure 408 allowing a common frame of reference for the bearing element 412 to be maintained.

Referring now to FIGS. 5A, 5B, 5C, and 5D, the passing of control of a bearing element 520 between nest structures is described. A first nest structure 502 is secured at a first manipulator arm 504, and a second nest structure 506 is secured to a second manipulator arm 508. The first nest structure 502, first manipulator arm 504, second nest structure 506, and second manipulator arm 508 are as described with respect to similar elements described elsewhere herein. The first nest structure 502 and second nest structure 506 align along an axis 501.

Figure 5A:
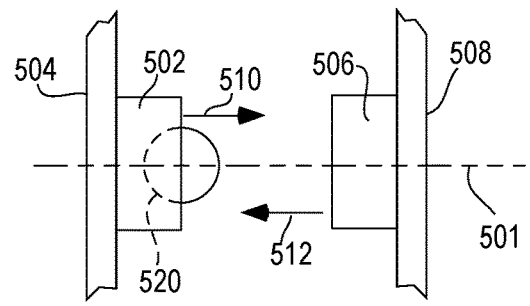
FIGS. 5A, 5B, 5C, and 5D illustrate the passing of control of a bearing element between nest structures according to an embodiment.

As shown in FIG. 5A, the bearing element 520 is secured in the first nest structure 502. The first nest structure 502 is moved (e.g., by moving a first stage structure as described elsewhere herein) in the direction indicated by the arrow labeled 510 towards the second nest structure 506. The second nest structure 506 is moved (e.g., by moving a second stage structure as described elsewhere herein) towards the first nest structure 502 in the direction indicated by the arrow labeled 512. As the first nest structure 502 moves, it carries the bearing element 520. The first manipulator arm 504 may be disposed on a first stage structure (not shown) and the second manipulator arm 508 may be disposed on a second stage structure. Movement of the stage structures causes movement of the corresponding arms and nest structures.

Figure 5B:
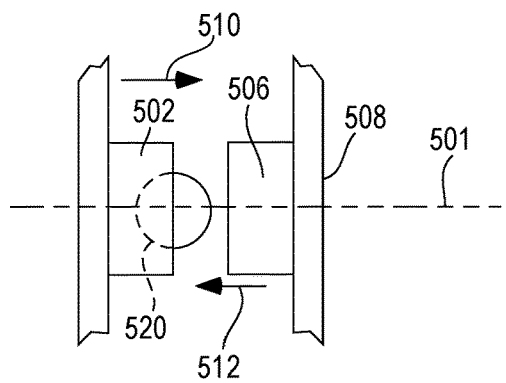

As shown in FIG. 5B, the first nest structure 502 continues to move in the direction indicated by the arrow labeled 510 towards the second nest structure 506. The second nest structure 506 continues to move towards the first nest structure 502 in the direction indicated by the arrow labeled 512. As the first nest structure 502 moves, it continues to carry the bearing element 520. In other examples, only one of the nest structures is moved and the other nest structure is fixed in location.

Figure 5C:
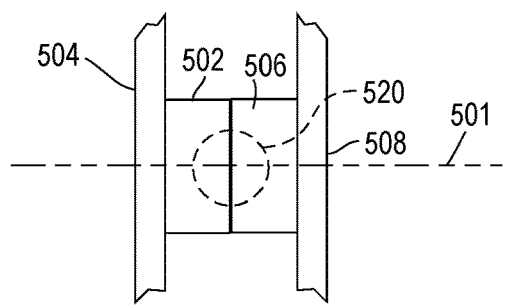

As shown in FIG. 5C, the first nest structure 502 and the second nest structure 506 have been brought together and are in contact. The bearing element 520 resides partially in the first nest structure 502 and the second nest structure 506. Initially, the first nest structure 502 secures the bearing element (e.g., by applying a vacuum suction to the bearing element 520 while the bearing element 520 is in the first nest structure 502). Then, the first nest structure 502 releases the bearing element 520 (e.g., by turning off the vacuum suction in the first nest structure 502) and the second nest structure 506 secures the bearing element 520 (e.g., by applying the vacuum suction in the second nest structure 506). After control and securement of the bearing element 520 passes from the first nest structure 502 to the second nest structure 506, the first nest structure 502 and the second nest structure 506 are moved apart.

Figure 5D:
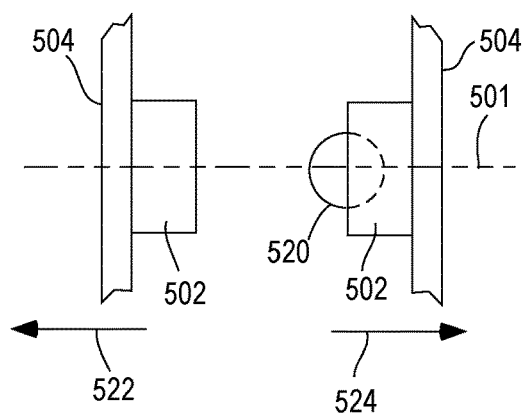

As shown in FIG. 5D, the bearing element 520 has been secured in the second nest structure 506. The first nest structure 502 is moved in the direction of the arrow labeled 522 away from the second nest structure 506. The second nest structure 506 is moved in the direction of the arrow labeled 524 away from the first nest structure 502.

Figure 6:
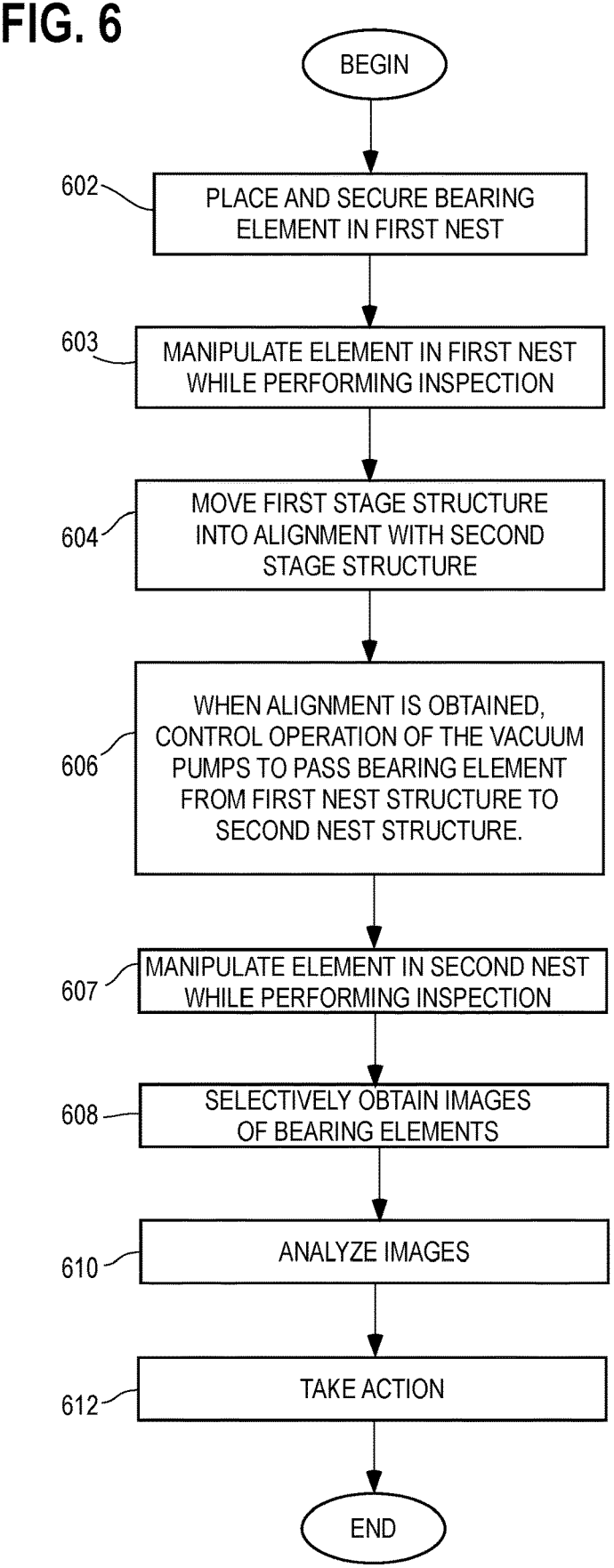
FIG. 6 is a flow chart of one approach for inspecting a bearing element according to an embodiment.

Referring now to FIG. 6, one example of inspecting a bearing element is described. A first stage structure that is coupled to and movable along one or more tracks by one or more motors and a second stage structure that is coupled to and movable along the one or more tracks by the one or more motors are provided. A first manipulator structure is disposed on the first stage structure and includes a first nest structure. The first nest structure is configured to secure a bearing element. A second manipulator structure is disposed on the second stage structure and includes a second nest structure. The second nest structure configured to secure the bearing element. These elements may be the same or similar elements as those described with respect to the examples of FIGS. 1-5.

Initially, at 602, the bearing element is retained in the first nest structure after the bearing element has been placed in the first nest structure. For example, a suction or vacuum that secures the bearing element in place can be utilized.

At 603, the bearing element is manipulated while retained in the first nest structure and a first inspection performed. For example, the first nest structure may be turned by moving an arm coupled to the first nest structure. The first nest structure may itself be rotated. During these motions, images of the bearing element may be obtained or a visual inspection by a human performed.

At 604, the one or more motors are actuated to align and bring adjacent the first nest structure with the second nest structure and the bearing element is at least partially contained in the first nest structure and second nest structure. In one example, the nest structures come into contact and allow the bearing element to be passed from one nest structure to the other nest structure.

When the alignment of the first nest structure and second nest structure is obtained, operation of the vacuum pumps, at 606, is controlled such that the bearing element is released from the first nest structure and secured in the second nest structure. Movement of the bearing element from the first nest structure to the second nest structure occurs without slippage resulting in preservation of a common frame of reference used when the bearing element is in the first nest structure and the second nest structure. The first nest structure and the second nest structure are separated.

At 607, the bearing element is manipulated while in the second nest structure and a second inspection performed. For example, the second nest structure may be turned by moving an arm coupled to the second nest structure. The second nest structure may itself be rotated. During these motions, images of the bearing element may be obtained or a visual inspection by a human performed.

At 608, the one or more cameras are operated to selectively obtained image data of the bearing element. It is contemplated that this may occur concurrently with the manipulation and inspection at 603 and/or the manipulation and inspection at 607.

At 610, the images are analyzed to determine defects of the bearing element. At 612, an action may be taken as a result of the analysis. Action may include automatically or manually replacing the part before it is assembled back into an assembly, fixing the part, or simply replacing the part back into the assembly. In other examples, an alert may be issued. The images may also be displayed to a user.

Referring now to FIGS. 7, 8, 9, and 10 an inspection system is shown and the exchange of bearing element from one nest structure to a second nest structure is described.

These figures show a system that includes a first stage structure 702, a second stage structure 705, tracks (or linear guides) 722, a first manipulator structure 707 (with a first manipulator arm 713), a second manipulator structure 709 (with a second manipulator arm 715), a first nest structure 704 (coupled to the first manipulator arm 713), a second nest structure 712 (coupled to the second manipulator arm 715). Also shown are motors 706, 710, 716, 718, and 714. A vacuum tube 717 couples to the second nest structure 712. A bearing element 720 is shown in either the first nest structure 704 or the second nest structure 712.

The system will also include a controller or control circuit, a machine learning algorithm stored in a memory, a display, a second vacuum pump, one or more cameras and lighting, and other motors. For simplicity, these elements are not shown in the examples of FIGS. 7, 8, 9, and 10.

A transmission element 708 (in this case a belt) couples between the motor 706 and an element that turn the second manipulator arm 715. The motor 716 may have a similar transmission element that is used to turn the first manipulator arm 713. Motor 710 may be used to rotate the second nest structure 712 and the motor 718 may be used to rotate the first nest structure 704. Other transmission elements not shown may be used to transfer power from the motors to rotate the nest structures 704 and 712. The motor 714 is used to move the second stage structure 705 along the tracks 722. A similar motor (not shown) is used to move the first stage structure 702. These elements have been described elsewhere herein and this description will not be repeated here.

Figure 7:
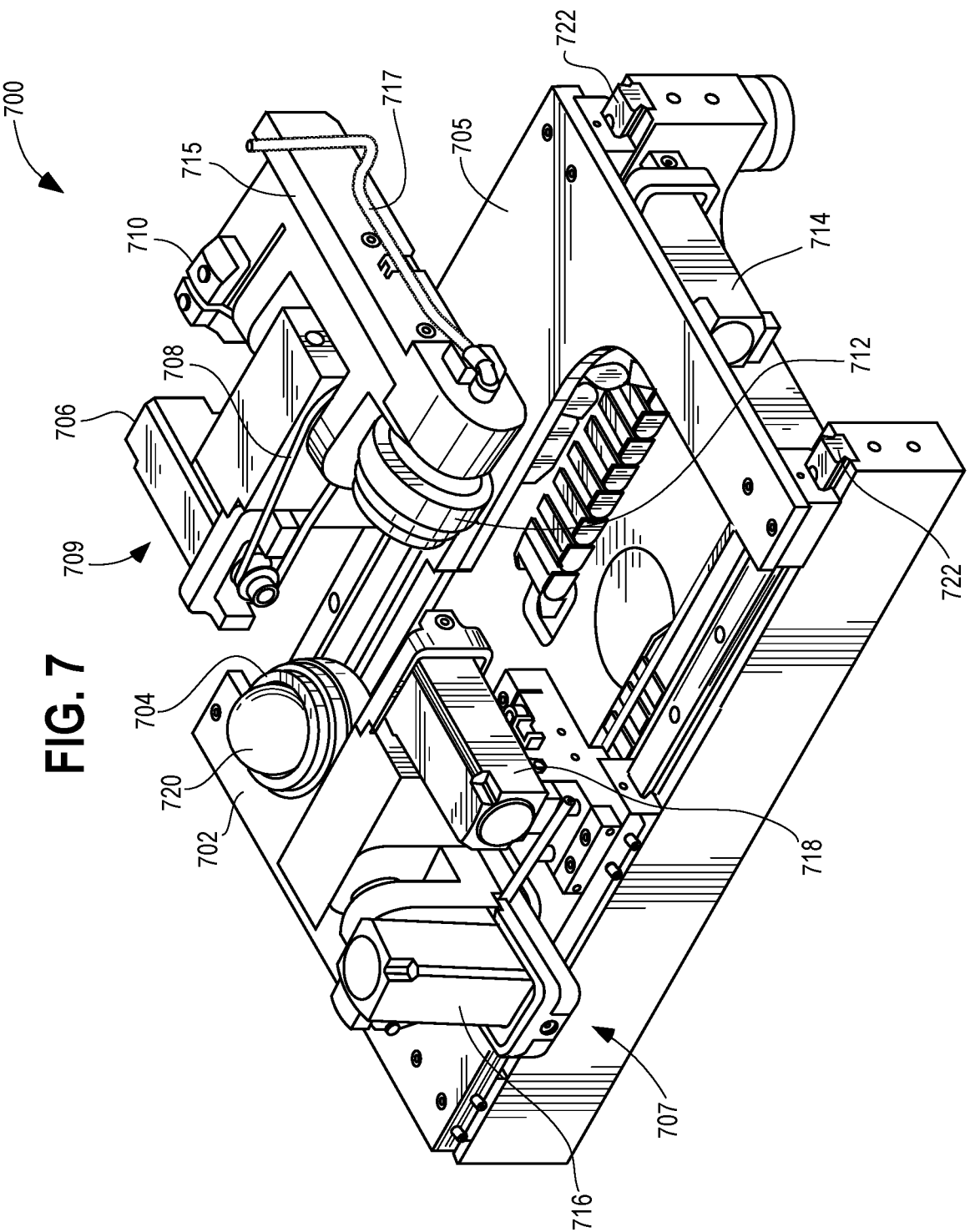
FIG. 7 illustrates an inspection system where the bearing element is disposed in a first nest structure and rotated upward according to an embodiment.
Figure 8:
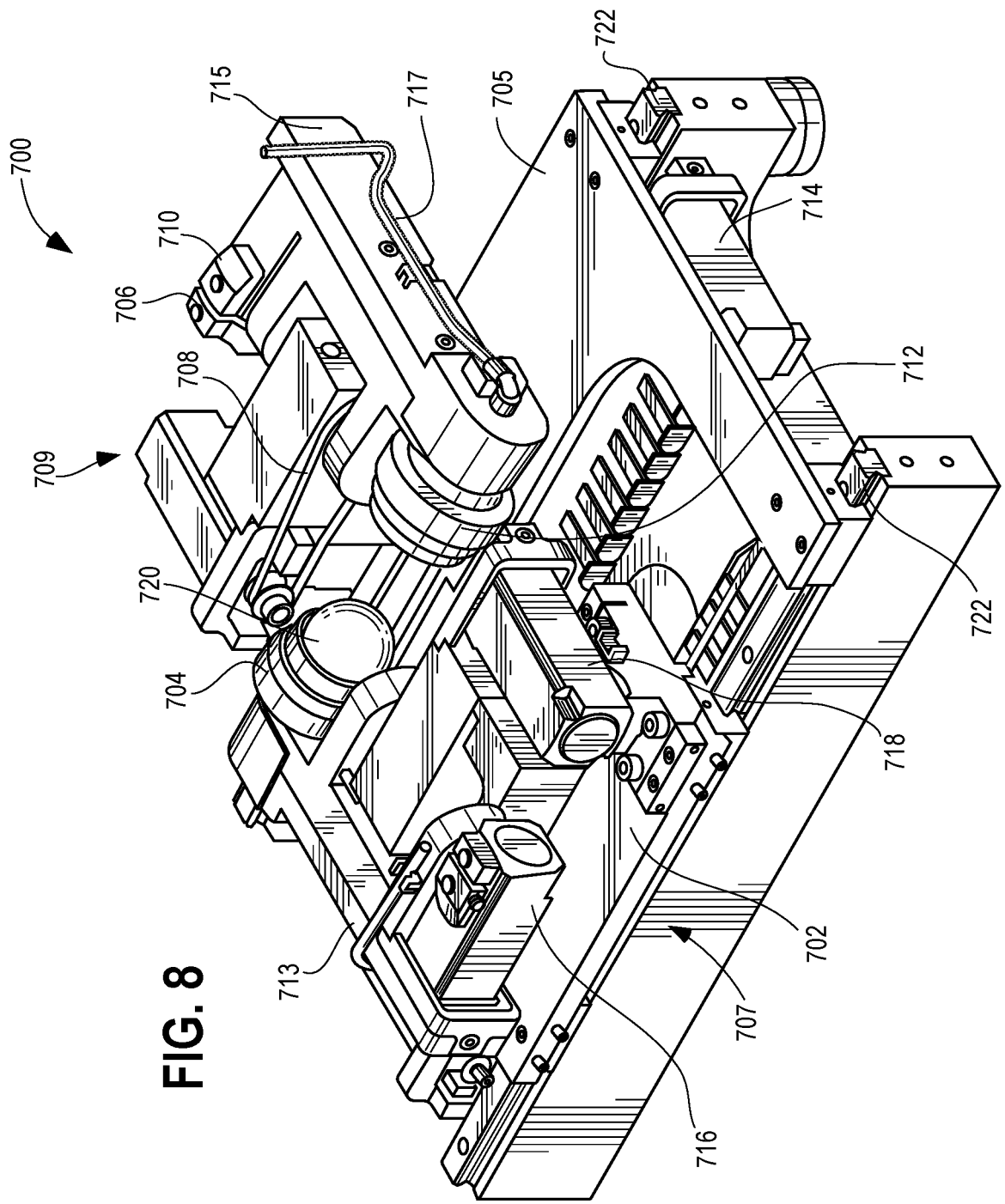
FIG. 8 illustrates an inspection system where the bearing element is disposed in a first nest structure and but rotated to face a second nest structure according to an embodiment.
Figure 9:
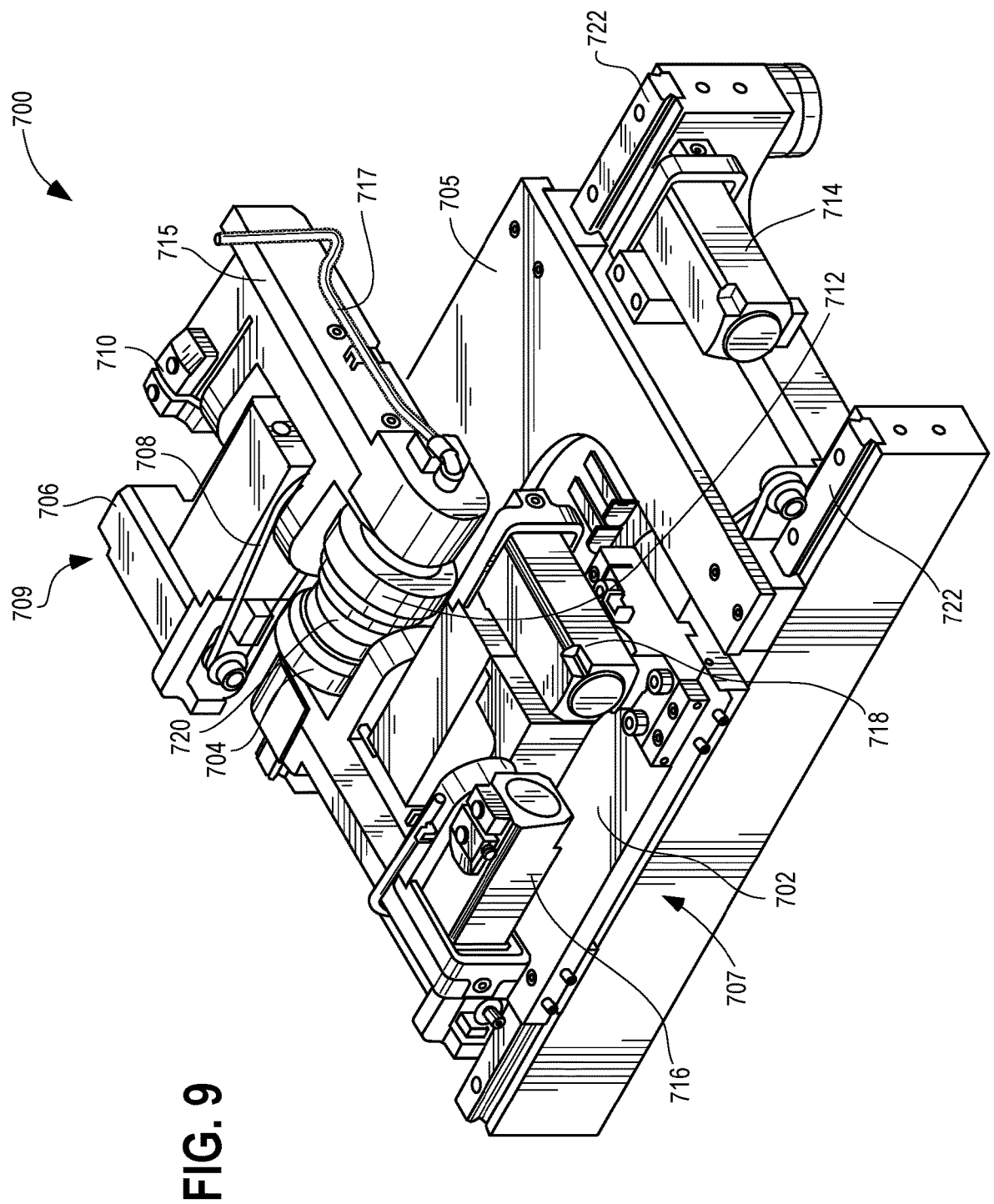
FIG. 9 illustrates an inspection system where the bearing element is being exchanged from the first nest structure to the second nest structure according to an embodiment.
Figure 10:
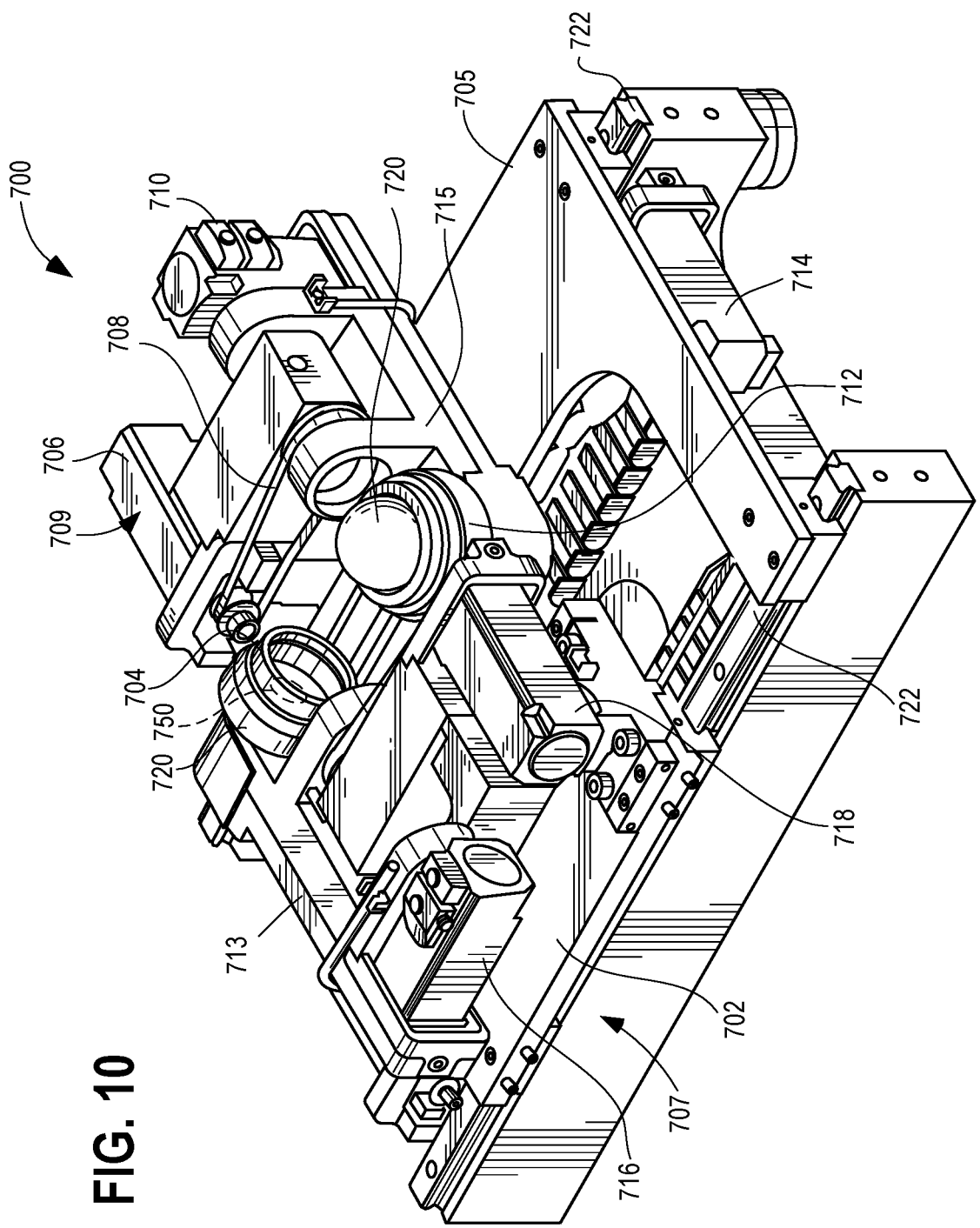
FIG. 10 illustrates an inspection system where the bearing element is disposed in a second nest structure and rotated upward according to an embodiment.

Generally speaking, FIG. 7 illustrate an inspection system 700 where the bearing element 720 is disposed in the first nest structure 704 and rotated upward. FIG. 8 illustrates the inspection system 700 where the bearing element 720 is disposed in the first nest structure 704 and is rotated to face the second nest structure 712. FIG. 9 illustrates the inspection system 700 where the bearing element 720 is being exchanged from the first nest structure 704 to the second nest structure 712. FIG. 10 illustrates the inspection system 700 where the bearing element is disposed in the second nest structure 712 and rotated upward for inspection.

Turning now to FIG. 7, the bearing element 720 is disposed in a first nest structure 704 and rotated upward. The camera (not shown) can be positioned on or secured to a stand so as to be positioned generally above the first nest structure 704 to take photos of the bearing element 720. The first nest structure 704 may rotate so that optimal viewing angles are provided to the camera to obtaining photos of the bearing element 720 from a variety of positions and perspectives. As the first nest structure 704 rotates, the bearing element 720 does not slip, slide, or move within the first nest structure 704. In these examples, the camera may be in a fixed position, but in other examples the position of the camera may be manually or automatically adjustable.

Turning now to FIG. 8, the bearing element 720 is disposed in a first nest structure 704 and is rotated to face a second nest structure 712. The camera(s) can take additional photos of the bearing element in this position.

Turning now to FIG. 9, control of the bearing element 720 is being exchanged and handed from the first nest structure 704 to the second nest structure 712. The first next structure 704 and the second nest structure 712 have been moved together so that the bearing element is at least partially disposed within each nest structure. In this case, the bearing element 720 is a ceramic ball and approximately one half the volume of the bearing element 720 is disposed in the first nest structure 704 and one half the volume of the bearing element is disposed in the second nest structure 712. Initially, a vacuum suction is provided to hold the bearing element 720 in the first nest structure 704 using a first vacuum pump (not shown) coupled to a first vacuum hose (not shown), which is in turn communicates with an opening 750 (shown in FIG. 10) in the first nest structure 704. The opening 750 is at the bottom of bowl-shaped next structure.

This is turned off and simultaneously (or nearly simultaneously) a suction is provided (from a second vacuum pump (not shown) via the second vacuum tube 717, which communicates with a second opening (not shown) in the second nest structure 712) to secure the bearing element 720 in the second nest structure 712. Thus, securement and attachment of the bearing element 720 is moved from the first nest structure 704 to the second nest structure 712, and secured in the second nest structure 712 without any sliding, slipping, or other similar movement of the bearing element 720 relative to the nest structures 704 and 712 and with respect to a fixed (x, y, z) coordinate system or a spherical coordinate system (r, theta, phi, where r=radius of the sphere– theta=polar angle, and phi azimuthal angle) that describes the inspection system 700 and elements in the inspection system 700.

Turning now to FIG. 10, the bearing element 720 is disposed in a second nest structure 712 and rotated by the second manipulator arm 715 upward for further inspection (e.g., obtaining more photos by the camera). As mentioned, the camera (not shown) can be positioned on a stand generally above the second nest structure 712 (the second manipulator arm 715 can the second stage structure 705 moved to be generally above the bearing element 720 to take photos of the bearing element 720. The second nest structure 712 may also rotate so that optimal viewing angles are provided to the camera to obtaining photos of the bearing element 720 from a variety of positions and perspectives while in the second nest structure 712.

Once the photos are obtained, machine learning algorithms may analyze the photos (e.g., to determine defects in the bearing element 720) and the results presented visually to a user at a user electronic device such as a smartphone or personal computer. The results may include some or all of the photos, determination of faults, and/or recommended actions to take. Other examples are possible.

The approaches described herein provide for fast and accurate positioning of bearing elements (e.g., ball bearings) ensuring full inspection coverage of bearing elements without slipping and without human intervention. In examples, these approaches secure bearing elements in nest structures with vacuum activation to securely hold the bearing. The nest structures can be designed so as to be compatible with multiple bearing element sizes elements (e.g., ceramic balls from approximately ⅞-inch diameters to 2- and ⅛-inch diameters).

As described herein in in some embodiments, two manipulators are mounted on the same linear axis. In order to achieve full coverage, a computer-based transfer sequence causes the passing of the bearing element from one manipulator to the other. The surfaces obscured in the initial fixturing are visible on the second manipulator and the reference datums of the bearing element are maintained. In one embodiment, the system includes a single camera under which the element is manipulated. In other embodiments there may be multiple cameras or other imaging devices.

In aspects, the system is computer controlled. Specific routines (e.g., implemented at least in part by computer software) can be utilized in order to achieve, for example, a visual inspection of an entire sphere of a ceramic ball with accurate tagging of detected defects. In other aspects, the system integrates various image sensor(s) and illumination devices to enable automated detection and classification of a variety of anomalies, utilizing different types of artificial intelligence (AI) architectures.

Advantageously, the approaches presented herein ensure accurate element positioning and provide full coverage for the bearing element being inspected. The present approaches allow no risk of slippage that could affect coverage and maintaining of datums.

Further, the present approaches enable automated fluorescent penetrant inspection on bearing elements and enable automated white light inspection on ceramic bearing elements. In further examples, ceramic ball fluorescent penetrant inspection (FPI) cycle time is significantly reduced (e.g., by a factor up to 15 times).

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following claims:

A system for inspecting bearing elements, the system comprising: at least one vacuum pump; at least one sensor; at least one drive element; a first mounting device coupled to the at least one vacuum pump and the at least one drive element, the first mounting device configured to secure a bearing element using the at least one vacuum pump; a second mounting device coupled to the at least one vacuum pump and the at least one drive element, the second mounting device configured to secure the bearing element using the at least one vacuum pump; a controller coupled to the at least one vacuum pump, the at least one sensor, and the at least one drive element, the controller configured to: control operation of the at least one vacuum pump to initially secure the bearing element in the first mounting device; actuate the at least one drive element to responsively move the first mounting device and the second mounting device into an alignment such that the first mounting device is aligned with and adjacent to the second mounting device and the bearing element is at least partially contained in the first mounting device and second mounting device; when the alignment of the first mounting device and second mounting device is obtained, control operation of the at least one vacuum pump such that the bearing element is released from the first mounting device and secured in the second mounting device, wherein movement and securement of the bearing element from the first mounting device to the second mounting device without slippage resulting in preservation of a common frame of reference used when the bearing element is in the first mounting device and the second mounting device; actuate the at least one sensor to obtain images of the bearing element; and analyze the images to determine defects of the bearing element.

The system of any preceding clause, wherein the first mounting device comprises a first manipulator structure coupled to a first stage structure and the second mounting device comprises a second manipulator structure coupled to a second stage structure.

The system of any preceding clause, wherein the first manipulator structure comprises a first nest structure coupled to the at least one vacuum pump and the second manipulator structure comprises a second nest structure coupled to the at least one vacuum pump.

The system of any preceding clause, wherein the at least one drive element comprises at least one motor.

The system of any preceding clause, wherein the first nest structure and the second nest structure are compatible to hold different-sized bearing elements.

The system of any preceding clause, wherein the at least one sensor comprises at least one camera.

A system for inspecting bearing elements, the system comprising: one or more cameras; one or more motors; a first stage structure coupled to and movable along one or more tracks by the one or more motors; a second stage structure coupled to and movable along the one or more tracks by the one or more motors; a first manipulator structure disposed on the first stage structure, the first manipulator structure including a first nest structure, the first nest structure configured to secure a bearing element; a second manipulator structure disposed on the second stage structure, the second manipulator structure including a second nest structure, the second nest structure configured to secure the bearing element; a controller coupled to the one or more cameras and the one or more motors, the controller configured to: control operation of the first nest structure so as to initially secure the bearing element in the first nest structure; actuate the one or more motors to responsively move the first stage structure and the second stage structure into an alignment such that the first nest structure is aligned with and adjacent to the second nest structure and the bearing element is at least partially contained in the first nest structure and second nest structure; when the alignment of the first nest structure and second nest structure is obtained, control operation of the first nest structure and the second nest structure such that the bearing element is released from the first nest structure and secured in the second nest structure, wherein movement or securement of the bearing element from the first nest structure to the second nest structure occurs without slippage resulting in preservation of a common frame of reference used when the bearing element is in the first nest structure and the second nest structure; actuate the one or more cameras to obtain images of the bearing element; analyze the images of the bearing element to determine defects of the bearing element.

The system of any preceding clause, wherein the first manipulator structure disposed on the first stage structure includes a first manipulator arm and a first movement of the first arm controlled by the one or more motors, and wherein the second manipulator structure includes a second manipulator arm, and a second movement of the second manipulator arm controlled by the one or more motors.

The system of any preceding clause wherein the controller is further configured to actuate the one or more motors so as to move one or more of the first manipulator arm and the second manipulator arm in a third movement, the third movement of the first manipulator arm or the second manipulator arm being effective to move the first nest structure or the second nest structure and adjust a position of the bearing element with respect to the one or more cameras.

The system of any preceding clause, wherein the first movement of the first manipulator arm and the second movement of the second manipulator arm is a rotation.

The system of any preceding clause, wherein the images of the bearing element are analyzed using a machine learning algorithm.

The system of any preceding clause, wherein the first nest structure and the second nest structure are individually movable by the one or more motors.

The system of any preceding clause, wherein the defects comprise cracks.

The system of any preceding clause, wherein the first nest structure comprises a bowl-shaped structure with an opening at a bottom of the bowl-shaped structure.

The system of any preceding clause, wherein the opening communicates with a vacuum pump.

The system of any preceding clause, wherein the bearing element comprises a ball or a roller.

A method for inspecting a bearing element, the method comprising: providing a first stage structure that is coupled to and movable along one or more tracks by one or more motors and a second stage structure that is coupled to and movable along the one or more tracks by the one or more motors; wherein a first manipulator structure is disposed on the first stage structure and includes a first nest structure, the first nest structure configured to secure a bearing element, and wherein a second manipulator structure disposed on the second stage structure and includes a second nest structure, the second nest structure configured to secure the bearing element; controlling operation of at least one vacuum pump so as to initially secure the bearing element in the first nest structure; actuating the one or more motors to responsively move the first stage structure and the second stage structure into an alignment such that the first nest structure is aligned with and adjacent to the second nest structure and the bearing element is at least partially contained in the first nest structure and second nest structure; when the alignment of the first nest structure and second nest structure is obtained, controlling operation of the at least one vacuum pump such that the bearing element is released from the first nest structure and secured in the second nest structure, wherein movement or securement of the bearing element from the first nest structure to the second nest structure occurs without slippage resulting in preservation of a common frame of reference used when the bearing element is in the first nest structure and the second nest structure; actuating the one or more cameras to obtain images of the bearing element; analyzing the images of the bearing element to determine defects of the bearing element.

The method of any preceding clause, further comprising controlling a movement of a first manipulator arm disposed at the first manipulator structure and controlling a movement of a second manipulator arm disposed at the second manipulator structure.

The method of any preceding clause, further comprising moving one or more of the first manipulator arm and the second manipulator arm to move the first nest structure or the second nest structure and adjust a position of the bearing element with respect to the one or more cameras.

The method of any preceding clause, wherein the movement of the first manipulator arm and the second manipulator arm is a rotation.

The method of any preceding clause, wherein analyzing the images of the bearing element comprises analyzing the images using a machine learning algorithm.

The method of any preceding clause, wherein the first nest structure and the second nest structure are individually movable by the one or more motors.

The method of any preceding clause, wherein the defects comprise cracks.

The method of any preceding clause, wherein the first nest structure comprises a bowl-shaped structure with an opening with an opening at a bottom of the bowl-shaped structure.

The method of any preceding clause, wherein the opening communicates with a vacuum pump.

The method of any preceding clause, wherein the bearing element comprises a ball or a roller.

Those skilled in the art will recognize that a wide variety of modifications, alterations, and combinations can be made with respect to the above-described embodiments without departing from the scope of the invention, and that such modifications, alterations, and combinations are to be viewed as being within the ambit of the inventive concept.

What is claimed is:

1. A system for inspecting bearing elements, the system comprising:
   at least one vacuum pump;
   at least one sensor;
   at least one drive element;
   a first mounting device coupled to the at least one vacuum pump and the at least one drive element, the first mounting device configured to secure a bearing element using the at least one vacuum pump;
   a second mounting device coupled to the at least one vacuum pump and the at least one drive element, the second mounting device configured to secure the bearing element using the at least one vacuum pump;
   a controller coupled to the at least one vacuum pump, the at least one sensor, and the at least one drive element, the controller configured to:
      control operation of the at least one vacuum pump to initially secure the bearing element in the first mounting device;
      actuate the at least one drive element to responsively move the first mounting device and the second mounting device into an alignment such that the first mounting device is aligned with and adjacent to the second mounting device and the bearing element is at least partially contained in the first mounting device and second mounting device;
      when the alignment of the first mounting device and second mounting device is obtained, control operation of the at least one vacuum pump such that the bearing element is released from the first mounting device and secured in the second mounting device, wherein movement and securement of the bearing element from the first mounting device to the second mounting device without slippage resulting in preservation of a common frame of reference used when the bearing element is in the first mounting device and the second mounting device;
      actuate the at least one sensor to obtain images of the bearing element; and
      analyze the images to determine defects of the bearing element.

2. The system of claim 1, wherein the first mounting device comprises a first manipulator structure coupled to a first stage structure and the second mounting device comprises a second manipulator structure coupled to a second stage structure.

3. The system of claim 2, wherein the first manipulator structure comprises a first nest structure coupled to the at least one vacuum pump and the second manipulator structure comprises a second nest structure coupled to the at least one vacuum pump, wherein the first nest structure and the second nest structure are configured to hold the bearing element.

4. The system of claim 3, wherein the at least one drive element comprises at least one motor.

5. The system of claim 4, wherein the first nest structure and the second nest structure are compatible to hold different-sized bearing elements.

6. The system of claim 5, wherein the at least one sensor comprises at least one camera.

7. A system for inspecting bearing elements, the system comprising:
   one or more cameras;
   one or more motors;
   at least one vacuum pump;
   a first stage structure coupled to and movable along one or more tracks by the one or more motors;
   a second stage structure coupled to and movable along the one or more tracks by the one or more motors;
   a first manipulator structure disposed on the first stage structure, the first manipulator structure including a first nest structure, the first nest structure configured to secure a bearing element;
   a second manipulator structure disposed on the second stage structure, the second manipulator structure including a second nest structure, the second nest structure configured to secure the bearing element;
   a controller coupled to the one or more cameras and the one or more motors, the controller configured to:
      control operation of the at least one vacuum pump communicating with a first opening in the first nest structure and a second opening in the second nest structure so as to initially secure the bearing element in the first nest structure;
      actuate the one or more motors to responsively move the first stage structure and the second stage structure into an alignment such that the first nest structure is aligned with and adjacent to the second nest structure and the bearing element is at least partially contained in the first nest structure and second nest structure;
      when the alignment of the first nest structure and second nest structure is obtained, control operation of the at least one vacuum pump such that the bearing element is released from the first nest structure and secured in the second nest structure, wherein movement or securement of the bearing element from the first nest structure to the second nest structure occurs without slippage resulting in preservation of a common frame of reference used when the bearing element is in the first nest structure and the second nest structure;

actuate the one or more cameras to obtain images of the bearing element; and analyze the images of the bearing element to determine defects of the bearing element.

8. The system of claim 7, wherein the first manipulator structure disposed on the first stage structure includes a first manipulator arm and a first movement of the first manipulator arm is controlled by the one or more motors, and wherein the second manipulator structure includes a second manipulator arm, and a second movement of the second manipulator arm is controlled by the one or more motors.

9. The system of claim 8, wherein the controller is further configured to actuate the one or more motors so as to move one or more of the first manipulator arm and the second manipulator arm in a third movement, the third movement of the first manipulator arm or the second manipulator arm being effective to move the first nest structure or the second nest structure and adjust a position of the bearing element with respect to the one or more cameras.

10. The system of claim 8, wherein the first movement of the first manipulator arm and the second movement of the second manipulator arm is a rotation.

11. The system of claim 7, wherein the first nest structure and the second nest structure are individually movable by the one or more motors.

12. The system of claim 7, wherein the first nest structure comprises a bowl-shaped structure with an opening at a bottom of the bowl-shaped structure.

13. The system of claim 7, wherein the bearing element comprises a ball or a roller.

14. A method for inspecting a bearing element, the method comprising:

providing a first stage structure that is coupled to and movable along one or more tracks by one or more motors and a second stage structure that is coupled to and movable along the one or more tracks by the one or more motors;

wherein a first manipulator structure is disposed on the first stage structure and includes a first nest structure, the first nest structure configured to secure a bearing element, and wherein a second manipulator structure disposed on the second stage structure and includes a second nest structure, the second nest structure configured to secure the bearing element;

controlling operation of at least one vacuum pump so as to initially secure the bearing element in the first nest structure;

actuating the one or more motors to responsively move the first stage structure and the second stage structure into an alignment such that the first nest structure is aligned with and adjacent to the second nest structure and the bearing element is at least partially contained in the first nest structure and second nest structure;

when the alignment of the first nest structure and second nest structure is obtained, controlling operation of the at least one vacuum pump such that the bearing element is released from the first nest structure and secured in the second nest structure, wherein movement or securement of the bearing element from the first nest structure to the second nest structure occurs without slippage resulting in preservation of a common frame of reference used when the bearing element is in the first nest structure and the second nest structure;

actuating one or more cameras to obtain images of the bearing element; and analyzing the images of the bearing element to determine defects of the bearing element.

15. The method of claim 14, further comprising controlling a first movement of a first manipulator arm disposed at the first manipulator structure, and controlling a second movement of a second manipulator arm disposed at the second manipulator structure.

16. The method of claim 15, further comprising moving one or more of the first manipulator arm and the second manipulator arm to move the first nest structure or the second nest structure and adjust a position of the bearing element with respect to the one or more cameras.

17. The method of claim 15, wherein the first movement of the first manipulator arm and the second movement of the second manipulator arm is a rotation.

18. The method of claim 14, wherein the first nest structure and the second nest structure are individually movable by the one or more motors.

19. The method of claim 14, wherein the first nest structure comprises a bowl-shaped structure.

20. The method of claim 14, wherein the bearing element comprises a ball or a roller.

* * * * *